(12) United States Patent
Lin

(10) Patent No.: US 12,739,795 B2
(45) Date of Patent: Sep. 15, 2026

(54) METHOD AND DEVICE FOR VERIFYING SIDELINK RESOURCES, AND USER EQUIPMENT

(71) Applicant: GUANGDONG OPPO MOBILE TELECOMMUNICATIONS CORP., LTD., Dongguan (CN)

(72) Inventor: Huei-Ming Lin, Taipei (TW)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 327 days.

(21) Appl. No.: 18/432,840

(22) Filed: Feb. 5, 2024

(65) Prior Publication Data

US 2024/0179682 A1 May 30, 2024

Related U.S. Application Data

(63) Continuation of application No. PCT/CN2022/125723, filed on Oct. 17, 2022.

(60) Provisional application No. 63/263,651, filed on Nov. 5, 2021.

(51) Int. Cl.

| | |
|---|---|
| ***H04W 72/02*** | (2009.01) |
| ***H04W 72/25*** | (2023.01) |
| ***H04W 72/40*** | (2023.01) |
| *H04W 92/18* | (2009.01) |

(52) U.S. Cl.

CPC ........... *H04W 72/02* (2013.01); *H04W 72/25* (2023.01); *H04W 72/40* (2023.01); *H04W 92/18* (2013.01)

(58) Field of Classification Search

None

See application file for complete search history.

(56) References Cited

U.S. PATENT DOCUMENTS

| | | | | |
|---|---|---|---|---|
| 11,647,540 | B2 * | 5/2023 | Lee | H04W 4/40 370/329 |
| 11,902,947 | B2 * | 2/2024 | Ko | H04L 1/1812 |
| 11,963,138 | B2 * | 4/2024 | Ko | H04W 72/02 |
| 12,096,408 | B2 * | 9/2024 | Farag | H04L 5/0094 |
| 12,245,207 | B2 * | 3/2025 | Ko | H04L 5/0037 |

(Continued)

FOREIGN PATENT DOCUMENTS

| | | | |
|---|---|---|---|
| WO | 2021163460 | A1 | 8/2021 |
| WO | 2021208753 | A1 | 10/2021 |

OTHER PUBLICATIONS

Supplementary European Search Report in the European application No. 22889100.8, mailed on Sep. 3, 2025.

(Continued)

*Primary Examiner* — Faiyazkhan Ghafoerkhan

(74) *Attorney, Agent, or Firm* — Ladas & Parry LLP

(57) ABSTRACT

A method and device for verifying sidelink resources, a terminal and a UE are provided. The method includes: UE determines pre-selected sidelink resources and/or reserved sidelink resources, the sidelink resources being used for aperiodic sidelink transmission; and the UE performs re-evaluation on the pre-selected sidelink resources and/or pre-emption checking on the reserved sidelink resources based on all available periodic-based partial sensing (PBPS) and/or contiguous partial sensing (CPS) results, the aperiodic sidelink transmission being defined by a resource reservation periodicity set to zero.

20 Claims, 3 Drawing Sheets

UE determines pre-selected sidelink resources and/or reserved sidelink resources, the sidelink resources being used for aperiodic sidelink transmission

201

The UE performs re-evaluation on the pre-selected sidelink resources and/or pre-emption checking on the reserved sidelink resources based on all available PBPS and/or CPS results

202

(56) References Cited

U.S. PATENT DOCUMENTS 12,328,764 B2* 6/2025 Hoang .................. H04W 72/02
2022/0225408 A1* 7/2022 Lee .......................... H04W 4/40
2022/0295482 A1* 9/2022 Farag .................... H04L 5/0053
2022/0377733 A1* 11/2022 Ko ........................ H04L 5/0037
2022/0417991 A1* 12/2022 Farag .................... H04L 1/1812
2023/0025259 A1* 1/2023 Farag .................... H04W 72/20
2023/0038045 A1* 2/2023 Ko ........................ H04W 76/28
2023/0080157 A1* 3/2023 Ko ........................ H04L 1/1812
370/329
2023/0128828 A1* 4/2023 Ko .................... H04W 52/0212
370/329
2023/0156789 A1* 5/2023 Lee ......................... H04W 4/40
370/329
2023/0199725 A1* 6/2023 Ko ........................ H04W 92/18
370/329
2024/0032099 A1* 1/2024 Hoang .................. H04W 72/02
2024/0098713 A1* 3/2024 Ko ........................ H04L 1/1812
2024/0137159 A1* 4/2024 Lee ....................... H04L 5/0053
2024/0163848 A1* 5/2024 Ko ........................ H04L 1/1812
2024/0179682 A1* 5/2024 Lin ....................... H04W 72/02
2024/0224380 A1* 7/2024 Yang ..................... H04W 76/28
2024/0236949 A1* 7/2024 Ko ........................ H04W 72/02
2024/0244512 A1* 7/2024 Liu ....................... H04W 28/04
2024/0244594 A1* 7/2024 Liu ....................... H04W 52/02
2024/0244648 A1* 7/2024 Ko ........................ H04L 1/1896
2024/0251436 A1* 7/2024 Ko ........................ H04W 72/56
2024/0260002 A1* 8/2024 Ko .................... H04W 72/0446
2024/0260131 A1* 8/2024 Yue ................... H04W 52/0216
2024/0267892 A1* 8/2024 Ko .................... H04W 72/0446
2024/0291534 A1* 8/2024 Ko ........................ H04L 5/0048
2024/0323978 A1* 9/2024 Ko ........................ H04W 72/40
2024/0334458 A1* 10/2024 Ko ...................... H04W 72/541
2024/0334534 A1* 10/2024 Ko ........................ H04W 72/02
2024/0340922 A1* 10/2024 Ko ........................ H04W 72/25
2024/0341008 A1* 10/2024 Lee .......................... H04W 4/40
2024/0365342 A1* 10/2024 Ko ........................ H04W 72/25
2024/0365344 A1* 10/2024 Ko ........................ H04L 5/0094
2024/0365350 A1* 10/2024 Ko .................... H04W 52/0212
2024/0380526 A1* 11/2024 Ko .................... H04W 74/0808
2024/0389075 A1* 11/2024 Ko ........................ H04W 92/18
2024/0406978 A1* 12/2024 Zhou .................... H04B 17/328
2024/0407001 A1* 12/2024 Hoang .................. H04W 72/02
2024/0430916 A1* 12/2024 Yoshioka .............. H04W 72/02
2025/0089029 A1* 3/2025 Farag .................... H04W 72/56
2025/0089071 A1* 3/2025 Ko .......................... H04W 4/40
2025/0358850 A1* 11/2025 Hoang .................. H04W 72/02

OTHER PUBLICATIONS

Oppo. "Discussion on power saving in NR sidelink communication", 3GPP TSG RAN WG1 #t06bis-e R1-2109059, Oct. 19, 2021(Oct. 19, 2021), sections 2.1-2.8, 20 pages.

Apple."On Sidelink Resource Allocation for Power Saving", 3GPP TSG RAN WG1 #106b-e R1-2110053,Oct. 19, 2021(Oct. 19, 2021), sections 1-2, 14 pages.

International Search Report in the international application No. PCT/CN2022/125723, mailed on Dec. 15, 2022, 3 pages.

Written Opinion of the International Search Authority in the international application No. PCT/CN2022/125723, mailed on Dec. 15, 2022, 4 pages.

* cited by examiner

METHOD AND DEVICE FOR VERIFYING SIDELINK RESOURCES, AND USER EQUIPMENT

CROSS-REFERENCE TO RELATED APPLICATIONS

This application is a continuation of International Application PCT/CN2022/125723 filed on Oct. 17, 2022, which claims priority to American Provisional Application No. 63/263,651 filed on Nov. 5, 2021. The contents of these applications are hereby incorporated by reference in their entireties.

TECHNICAL FIELD

Embodiments of the disclosure relates to the field of mobile communications, and more particularly to a method and device for verifying sidelink resources, and user equipment (UE).

BACKGROUND

On one hand, there is a risk of transmission collision for UE operating in power saving mode due to limited resource sensing or no sensing at all. On the other hand, those indicated/reserved resources from other UEs after the UE performs initial resource selection also increase the risk of transmission collision for the UE.

SUMMARY

The embodiments of the disclosure provide a method and device for verifying sidelink resources, UE, a chip, a computer-readable storage medium, a computer program product and a computer program.

An embodiment of the disclosure provides a method for verifying sidelink resources. The method may include the following operations.

UE determines pre-selected sidelink resources and/or reserved sidelink resources. The sidelink resources are used for aperiodic sidelink transmission.

The UE performs re-evaluation on the pre-selected sidelink resources and/or pre-emption checking on the reserved sidelink resources based on all available periodic-based partial sensing (PBPS) and/or contiguous partial sensing (CPS) results. The aperiodic sidelink transmission is defined by a resource reservation periodicity set to zero.

An embodiment of the disclosure provides a device for verifying sidelink resources. The device may include a memory storing computer-executable instructions; and a processor. The processor is configured to call and execute the computer-executable instructions in the memory to execute operations of: determining pre-selected sidelink resources and/or reserved sidelink resources, the sidelink resources being used for aperiodic sidelink transmission; and performing re-evaluation on the pre-selected sidelink resources and/or pre-emption checking on the reserved sidelink resources based on all available periodic-based partial sensing (PBPS) and/or contiguous partial sensing (CPS) results. The aperiodic sidelink transmission is defined by a resource reservation periodicity set to zero.

An embodiment of the disclosure provides a non-transitory computer-readable storage medium storing computer-executable instructions. The computer-executable instructions may cause the processor to execute the above method for verifying sidelink resources.

BRIEF DESCRIPTION OF DRAWINGS

The accompanying drawings described herein which are incorporated into and form a part of the disclosure are provided for the better understanding of the disclosure, and exemplary embodiments of the disclosure and description thereof serve to illustrate the disclosure but are not to be construed as improper limitations to the disclosure. In the accompanying drawings.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

Figure 1:
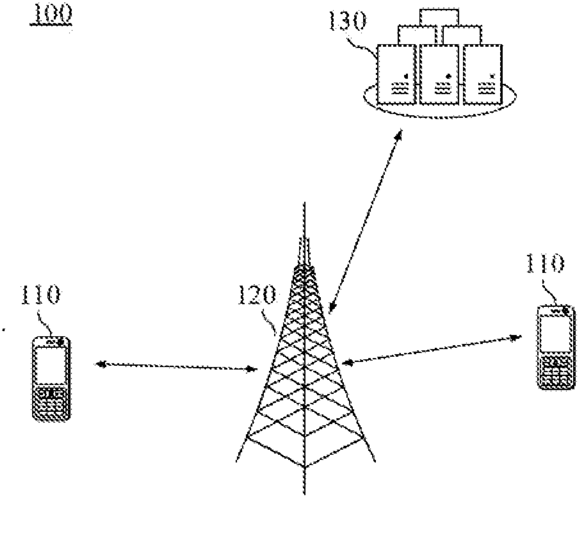
FIG. 1 is a schematic diagram of an application scenario according to an embodiment of the disclosure.

FIG. 1 is a schematic diagram of an application scenario according to an embodiment of the disclosure.

As illustrated in FIG. 1, a communication system 100 may include a terminal device 110 and a network device 120. The network device 120 may communicate with the terminal device 110 through an air interface. Multi-service transmission is supported between the terminal device 110 and the network device 120.

It is to be understood that embodiments of the disclosure are illustrative only with the communication system 100, but are not limited thereto. That is, the technical solutions in the embodiments of the disclosure may be applied for various communication systems, such as, a Long Term Evolution (LTE) system, an LTE Time Division Duplex (TDD) system, a Universal Mobile Telecommunication System (UMTS), an Internet of Things (IOT) system, a Narrow Band Internet of Things (NB-IoT) system, an enhanced Machine-Type Communications (EMTC) system, a 5G communication system (also called New Radio (NR) communication system), a Wi-Fi, an Non-Terrestrial Network (NTN), or a future communication system and the like.

In the communication system 100 in FIG. 1 illustrates a communication system 100. The network device 120 may be an access network device that communicates with the terminal device 110. The access network device may provide communication coverage for a specific geographical area, and may communicate with the terminal device 110 (such as, UE) in the coverage.

The network device 120 may be an Evolutional NodeB (eNB or eNodeB) in an LTE system, or a Next Generation Radio Access Network (NG RAN) device, or a gNB in a NR system, or a wireless controller in a Cloud Radio Access Network (CRAN); or the network device 120 may be a relay station, an access point, a Road Side Unit (RSU), a vehicle-mounted device, a wearable device, a hub, a switch, a bridge, a router, a network device in a future evolutional Public Land Mobile Network (PLMN) or the like.

The terminal device 110 may be any terminal device, and includes, but is not limited to, a terminal device connected to the network device 120 or another terminal device via a wired or wireless connection.

For example, the terminal device 110 may be an access terminal, UE, a user unit, a user station, a mobile station, a mobile radio station, a remote station, a remote terminal, a mobile device, a user terminal, a terminal, a wireless communication device, a user agent or a user device. The access terminal may be a cellular phone, a cordless telephone, a Session Initiation Protocol (SIP) phone, an Internet of Things (IoT) device, a satellite handheld terminal, a Wireless Local Loop (WLL) station, a Personal Digital Assistant (PDA), a handheld device having a wireless communication function, a computing device or other processing devices connected to a wireless modem, a vehicle-mounted device, a wearable device, a terminal device in a future 5G network, a terminal device in a future evolved network or the like.

The terminal device 110 may also perform Device to Device (D2D) communication.

The wireless communication system 100 may also include a core network device 130 that communicates with the base station. The core network device 130 may be a 5G Core (5GC) device, for example, an Access and Mobility Management Function (AMF), an Authentication Server Function (Authentication Server Function (AUSF), a User Plane Function (UPF), and for another example, a Session Management Function (SMF). Alternatively, the core network device 130 may also be an Evolved Packet Core (EPC) device in the LTE network, for example, a Session Management Function+Core Packet Gateway (SMF+PGW-C) device. It should be understood that SMF+PGW-C may simultaneously achieve the functions that SMF and PGW-C may perform. During the evolution of the network, the core network device may also be called other names or form a new network entity by dividing the functions of the core network, which is not limited by the embodiments of the disclosure.

The various functional units in the communication system 100 may also communicate with each other by establishing connections via the next generation network (NG) interface.

For example, the terminal device establishes an air interface connection with the access network device via the NR interface for transmission of user-plane data and control-plane signaling. The terminal device may establish a control-plane signaling connection to the AMF via a NG interface 1 (N1). The access network device, such as a gNB, may establish a user-plane data connection to the UPF via a NG interface 3 (N3). The access network device may establish a control-plane signaling connection to the AMF via a NG interface 2 (N2). The UPF may establish a control-plane signaling connection to the SMF via a NG interface 4 (N4). The UPF may interact with the data network for user-plane data via a NG interface 6 (N6). The AMF may establish a control-plane signaling connection to the SMF via a NG interface 11 (N11). The SMF may establish a control plane signaling connection with the PCF via a NG interface 7 (N7).

FIG. 1 exemplarily illustrates one base station, one core network device and two terminal devices. In one example, the communication system 100 may include multiple base stations, and another number of terminal devices may be included in coverage of each base station. No limits are made thereto in the embodiments of the disclosure.

FIG. 1 merely exemplarily illustrates the system to which the disclosure is applied, but the method in the embodiments of the disclosure may also be applied to other systems. Terms "system" and "network" in the disclosure may usually be interchanged in the disclosure. In the disclosure, the term "and/or" is only an association relationship describing associated objects and represents that three relationships may exist. For example, A and/or B may represent three conditions: i.e., independent existence of A, existence of both A and B, and independent existence of B. In addition, character "/" in the disclosure usually represents that previous and next associated objects form an "or" relationship. It is also to be understood that the term "indication" in embodiments of the present disclosure may be a direct indication, an indirect indication, or an indication of an associative relationship. For example, an indication of B by A may indicate that A directly indicates B, for example, B is obtained through A, or that A indirectly indicates B, for example, A indicates C and B is obtained through C, or that there is an association between A and B. It is also to be understood that the term "correspondence" in embodiments of the present disclosure may indicate a direct or indirect correspondence between the two elements, or may indicate an association between the two elements, or may indicate a relationship of indicating and being indicated, configuring and being configured, etc. It is also to be understood that the term "predefined" or "predefined rules" in embodiments of the present disclosure may be achieved by pre-storing corresponding codes, tables or other manners for indicating relevant information in devices (e.g., including a UE and a network device). The specific implementation is not limited in the present disclosure. For example, "predefined" may refer to those defined in a protocol. It is also to be understood that in the disclosure, "protocol" may refer to a standard protocol in the field of communication, which may include, for example, a LTE protocol, NR protocol and relevant protocol applied in the future communication system, which is not limited in the present disclosure.

To make the technical solutions of the embodiments of the disclosure to be understood better, the relevant technology of the embodiments of the disclosure is described below. The following relevant technology as optional solutions may be combined with the technical solutions of the embodiments in any way, and shall fall within the scope of protection of the disclosure.

In supporting portable sidelink terminals/devices with limited supply of battery power (a.k.a. power constrained user equipment (UE)), e.g., vulnerable road users such as pedestrian UEs in vehicle-to-everything (V2X) communication and augmented reality (AR)/virtual reality (VR) glasses, the UE may operate in a power saving mode for sidelink (SL) communication to prolong its functioning time duration. When a sidelink UE is operating in power saving mode, there are three main features by which the UE could use to reduce the power consumption of transmitting and receiving sidelink data information to/from other UEs, namely, partial sensing, random resource selection and sidelink-discontinuous reception (SL-DRX). In all of these power saving techniques, one common theme shared between them is to reduce the amount of UE listening/performing reception of sidelink control information (SCI) and/or data transmitted from other UEs. For example, when a power saving UE transmits packet data unit (PDU) or transport block (TB) using sidelink (over the PC5 interface), it can perform either partial sensing in which the UE monitors in limited number of slots based on predefined rules and configured sensing occasions/length to determine availability of future resources, or random resource selection in which the UE does not monitor the SL channel and resource pool at all and selects a number of resources randomly for its own (re)transmission of a sidelink PDU/TB. In either approach, there is a risk of selecting a resource that has already been reserved by another UE and causing a transmission collision due to limited resource sensing or no sensing at all from the transmitter-UE (Tx-UE). For the case when SL-DRX is configured for the Tx-UE, the UE may skip data reception and resource sensing during the SL-DRX inactive timer, and thus, also increase the chance of transmission collision.

Furthermore, after the Tx-UE performed an initial selection of resources for (re)transmission of a sidelink PDU/TB, new reservation/indication of resources may be made especially for high priority transmissions by other UEs operating in a same sidelink resource pool during the time gap between the initial selection of resources and the actual transmission of sidelink data. Similarly, the same may also occur during the time gap between the indication/reservation of future resources in SCI from the Tx-UE and the actual transmission of sidelink data. For these cases, those indicated/reserved resources from other UEs after Tx-UE's initial resource selection also increase the risk of transmission collision for the Tx-UE.

As such, there is a need to minimize and to avoid transmission collisions for Tx-UEs operating in power saving mode to improve the performance and reliability of sidelink communication. In order to ensure resources preselected and reserved by the Tx-UE have not been preempted or taking over by others operating in the same resource pool, in the method for verifying sidelink resources provided by the disclosure, after the Tx-UE has performed the initial selection of resources for transmission, resource re-evaluation and/or pre-emption checking of the pre-selected and/or reserved resources are performed right before the actual transmission by the Tx-UE, to ensure the resources are still available for use to avoid any potential collision. This is particular important for UEs that performed partial sensing on the sidelink channel/resource pool or random resource selection to further verify the availability, since the UE did not perform full sensing in every slot or any sensing in the past for the initial selection of resources.

To make the technical solutions of the embodiments of the disclosure to be understood better, the technical solutions of the disclosure are described below through the specific embodiments. The above relevant technology as optional solutions may be combined with the technical solutions of the embodiments of the disclosure in any way, and shall fall within the scope of protection of the disclosure. The embodiments of the disclosure include at least part of the following contents.

It should be noted that the technical solutions of the disclosure are applied to the following scenario of sidelink transmission: aperiodic sidelink transmissions with resource reservation periodicity set to zero.

It should be noted that the UE described in the technical solutions of the embodiments of the disclosure particularly refers to a transmitter-UE (Tx-UE). The Tx-UE refers to a transmitting end for sidelink transmission.

It should be noted that sidelink resources described in the technical solutions of the embodiments of the disclosure are used for aperiodic sidelink transmission, such as aperiodic transmission of a sidelink MAC PDU/transport block.

Figure 2:
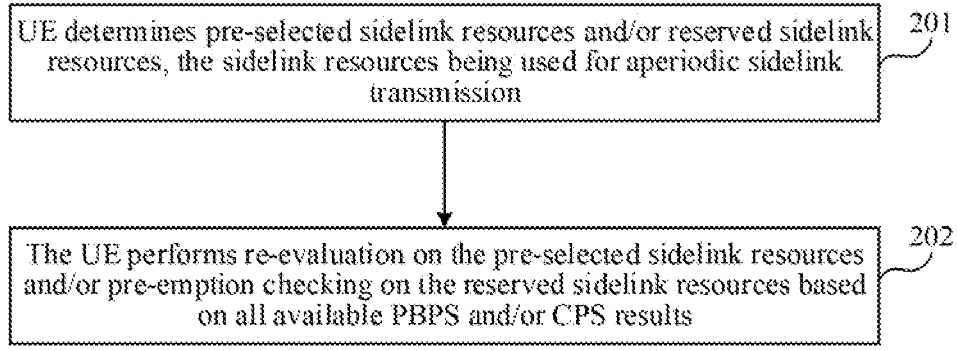
FIG. 2 is a schematic flowchart of a method for verifying sidelink resources according to an embodiment of the disclosure.

FIG. 2 is a schematic flowchart of a method for verifying sidelink resources according to an embodiment of the disclosure. As illustrated in FIG. 2, the method for verifying sidelink resources includes the following operations.

In 201, UE determines pre-selected sidelink resources and/or reserved sidelink resources. The sidelink resources are used for aperiodic sidelink transmission.

The aperiodic sidelink transmission is defined by a resource reservation periodicity set to zero, $P_{rsvp\_Tx}=0$.

In the embodiment of the disclosure, the number of pre-selected sidelink resources may be one or more, and the one or more pre-selected sidelink resources may also be referred to as a pre-selected resource set. Likewise, the number of reserved sidelink resources may be one or more and the one or more reserved sidelink resources may also be referred to as a reserved resource set.

Here, resources in the pre-selected resource set refer to pre-selected sidelink resources for re-evaluation, and resources in the reserved resource set refer to reserved sidelink resources for pre-emption checking.

The pre-selected resource set and the reserved resource set are resources selected by the UE during the initial selection of resources. The difference between the pre-selected resource set and the reserved resource set is in that a resource in the pre-selected resource set is not announced/indicated in a prior sidelink control information (SCI) transmitted in a physical sidelink control channel (PSCCH), while a resource in the reserved resource set has been announced/indicated in the prior SCI transmitted in the PSCCH.

In some implementation modes, the UE may determine the pre-selected sidelink resources and/or the reserved sidelink resources in the following manner.

A physical layer of the UE receives a first resource set and/or a second resource set provided by a higher layer. The first resource set includes a pre-selected resource set. The second resource set includes a reserved resource set. A resource in the pre-selected resource set is a pre-selected sidelink resource for re-evaluation, and a resource in the reserved resource set is a reserved sidelink resource for pre-emption checking. The pre-selected sidelink resource is a resource which has not been indicated by a prior SCI, and the reserved sidelink resource is a resource which has been indicated by the prior SCI. The first resource set includes resources selected by the higher layer of the UE within a remaining packet delay budget (PDB) during the initial resource selection.

In 202, the UE performs re-evaluation on the pre-selected sidelink resources and/or pre-emption checking on the reserved sidelink resources based on all available periodic-based partial sensing (PBPS) and/or contiguous partial sensing (CPS) results.

In some implementation modes, the UE may perform re-evaluation on the pre-selected sidelink resources and/or pre-emption checking on the reserved sidelink resources in the following manner.

S1) The UE determines a candidate slot set, and performs initialization on a candidate resource set based on the candidate slot set.

The candidate slot set includes slots selected by the UE within a remaining PDB based on PBPS and/or CPS results during the initial resource selection.

In some implementation modes, the UE initializes the candidate resource set to a remaining candidate slot set. Part or all of candidate slots in the remaining candidate slot set belong to the candidate slot set, and a starting slot corresponding to the remaining candidate slot set is a first slot with a smallest slot index among the first resource set and the second resource set. In at least one embodiment, the candidate resource set is initialized beyond an ending slot corresponding to the last slot of the candidate slot set if the number of slots in the remaining candidate slot set or the candidate resource set is less than a threshold. In at least one embodiment, the candidate resource set is initialized to the remaining candidate slot set, to enable the ending slot of the candidate resource set to be the last slot of the candidate slot set.

In one example, during the initial resource selection, a set of Y candidate slots 307 (i.e., the candidate slot set) may be selected within the remaining PDB based on PBPS results obtained for another sidelink transmission (e.g., periodic transmission). That is, sensing results for all the corresponding periodic sensing occasions are readily available also for the re-evaluation and pre-emption checking purposes if the same set of Y candidate slots 307 are used. As such, these sensing results should be reused as much as possible by initializing the candidate resource set ($S_A$) for re-evaluation and pre-emption checking to the set of all single-slot candidate resources starting from the first slot of the remaining Y candidate slots 308 (i.e., the remaining candidate slot set) from the initial resource selection. If the number of slots in the candidate resource set ($S_A$) or the remaining Y candidate slots is less than a configured $T_{2min}$ or $Y_{min}$ value, the candidate resource set ($S_A$) may be extended beyond the remaining Y candidate slots and up to the remaining PDB, even when the UE does not have corresponding sensing results (e.g., from PBPS) for the extended slots.

S2) The UE performs PBPS and/or CPS to obtain sensing results.

Specifically, the UE monitors target slots based on a PBPS process and/or a contiguous partial sensing (CPS) process, to obtain the sensing results.

In some implementation modes, the UE monitors periodic sensing occasions corresponding to the remaining candidate slot set after the initial resource selection when resource reservation sl-MultiReserveResource is enabled.

In one example, when the resource pool in which the resources are selected is configured with resource reservation for another TB (sl-MultiReserveResource) "enabled", the UE monitors periodic sensing occasions corresponding to the remaining Y candidate slots (i.e., the remaining candidate slot set)/the candidate resource set ($S_A$) for re-evaluation and pre-emption checking according to $t_{y-k \times Preserve}$ as per PBPS process from the initial resource selection procedure, where $t_y$ is a slot that belongs to the set of the remaining Y candidate slots (i.e., the remaining candidate slot set)/the candidate resource set ($S_A$), and Preserve is a configured list of resource reservation periodicities for the resource pool and it is used to determine the time locations of periodic sensing occasions when the UE performs PBPS for the remaining Y candidate slots (i.e., the remaining candidate slot set)/the candidate resource set ($S_A$).

In some implementation modes, the UE performs contiguous partial sensing within a monitoring window. In one embodiment, a starting slot of the monitoring window is at least M slots earlier than a first slot, and an ending slot of the monitoring window is N slots earlier than the first slot, which is the first slot of the remaining candidate slot set that corresponds to the smallest slot index among the first resource set and the second resource set. In another embodiment, a starting slot of the monitoring window is a first slot of the candidate slot set from the initial resource selection minus N, and an ending slot of the monitoring window is N slots earlier than a second slot, and the second slot has a smallest slot index among the first resource set and the second resource set. M and N are positive integers. A value of M is predefined, for example, M=31 by default, unless configured by a network with another value. Here, a value of N is associated with processing capability of the UE. For example, $N=T_{proc,0}+T_{proc,1}$, $T_{proc,0}$ and $T_{proc,1}$ have predefined values depending on a sub-carrier spacing. For example, $T_{proc,0}$ is a UE processing time of 1, 2 or 4 slots, and $T_{proc,1}$, is a UE processing time of 3, 5, 9 or 17 slots.

S3) The UE excludes one or more resources from the candidate resource set based on the sensing results. The remaining candidate resource set is used for the UE to perform sidelink transmission.

Specifically, when determining based on the sensing results that one or more resources in the candidate resource set overlap with one or more resources indicated in a received sidelink control information (SCI) and a reference signal received power (RSRP) measured for the received SCI is higher than a configured threshold, the UE excludes the one or more resources from the candidate resource set to obtain the remaining candidate resource set.

In some implementation modes, the physical layer of the UE reports the remaining candidate resource set to the higher layer.

In some implementation modes, when a first resource in the pre-selected resource set is not part of the remaining candidate resource set, the physical layer of the UE reports re-evaluation of the first resource to the higher layer; and/or, when a second resource in the reserved resource set is not part of the remaining candidate resource set and a priority value of the physical layer for the sidelink transmission is larger than a priority value in the received SCI, the physical layer of the UE reports pre-emption of the second resource to the higher layer.

According to the above technical solutions of the disclosure, after determining pre-selected sidelink resources and/or reserved sidelink resources, the UE performs re-evaluation on the pre-selected sidelink resources and/or pre-emption checking on the reserved sidelink resources, so as to minimize and avoid transmission collisions, thereby improving the performance and reliability of sidelink communication.

The technical solutions of the embodiments of the disclosure are described below in combination with specific application examples.

Figure 3:
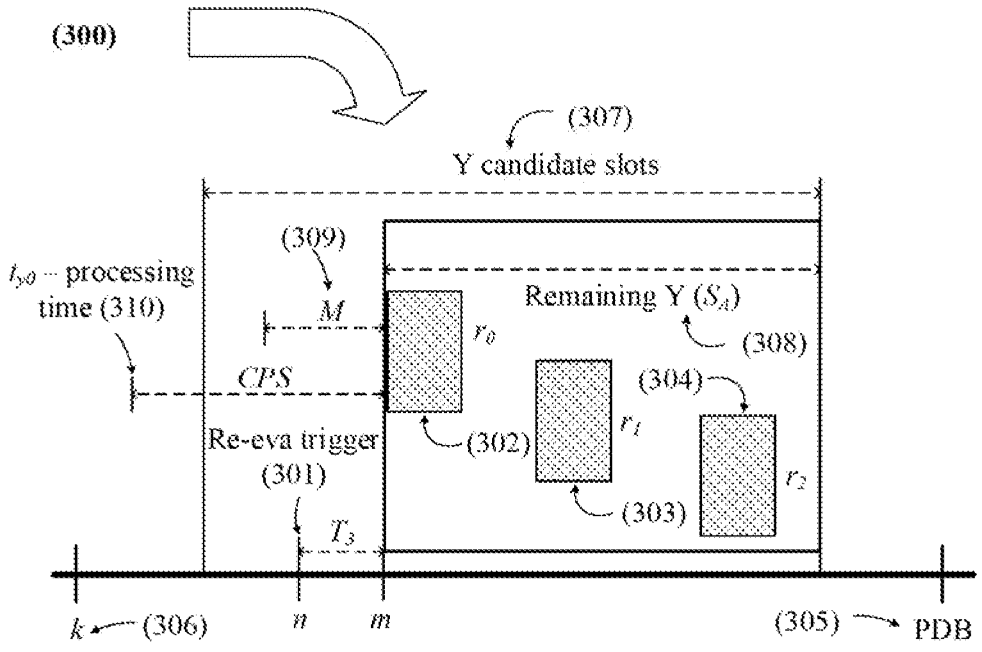
FIG. 3 is a schematic diagram of an application example according to an embodiment of the disclosure.

FIG. 3 is an exemplary illustration of the re-evaluation mechanism for pre-selected sidelink resources for aperiodic transmission according to an embodiment of the disclosure.

For aperiodic sidelink transmissions with resource reservation periodicity set to zero ($P_{rsvp\_TX}=0$) or not provided at all by the higher layer of the UE, the method for verifying sidelink resources may include the following functions/operations for re-evaluation and pre-emption checking of sidelink resources. It is to be noted that, it is not necessary for a UE to perform these functions/operations according to the following order, in order to implement the proposed method for re-evaluation and pre-emption checking of sidelink resources.

Initialization of Candidate Resource Set ($S_A$)

For a UE layer 1 (L1) receiving request from its higher layer in slot n to perform re-evaluation and pre-emption checking on sidelink resources, the higher layer provides a pre-selected resource set ($r_0$, $r_1$, $r_2$, . . . ) for re-evaluation and a reserved resource set ($r_0'$, $r_1'$, $r_2'$, . . . ) for pre-emption check. The pre-selected and reserved resource sets are resources selected by the UE during the initial selection of resources. The difference between a pre-selected ($r_x$) and a reserved resource ($r_x'$) of the UE is in whether the resource has been announced/indicated in a prior SCI transmitted in the physical sidelink control channel (PSCCH).

In reference to the diagram 300, FIG. 3 illustrates the proposed resource verification method for re-evaluation of a pre-selected sidelink resource set ($r_0$, $r_1$, $r_2$) for aperiodic transmission of a sidelink MAC PDU/transport block. The trigger timing of the re-evaluation process from the higher layer in slot n is denoted by item 301 in FIG. 3. The same process/method equally applies to a reserved resource set for aperiodic sidelink transmission. In the diagram 300, the pre-selected resource set ($r_0$, $r_1$, $r_2$) of 302, 303 and 304 were some of the resources selected by the UE within the remaining PDB 305 during the initial resource selection process triggered in slot k 306.

In addition to the resource set(s), the higher layer may provide one or more of the following information for the re-evaluation and pre-emption checking procedure: the resource pool in which the resources are located, L1 priority value for the sidelink transmission ($prio_{TX}$), and the remaining packet delay budget (PDB).

The timing or slot (n) in which the re-evaluation and pre-emption checking of pre-selected and reserved resource sets is requested/triggered by the higher layer should be just before earliest transmission resource provided by the higher layer. Assume that slot (m) is the smallest slot index among the resources from the pre-selected resource set ($r_0$, $r_1$, $r_2$, . . . ) for re-evaluation and the reserved resource set ($r_0'$, $r_1'$, $r_2'$, . . . ) for pre-emption checking. Then, the slot (n) in which the re-evaluation or pre-emption procedure is triggered and to be perform by the UE (L1) should be at $T_3$ before slot (m). $T_3$ is a UE processing time of 3, 5, 9 or 17 slots depending on sub-carrier spacing allowed for the UE to prepare PSCCH and physical sidelink shared channel (PSSCH) for transmission. In reference to the diagram 300, the re-evaluation checking slot (n) for the pre-selected resource set ($r_0$, $r_1$, $r_2$) may be at m-$T_3$ 301.

During the initial resource selection, a set of Y candidate slots 307 may be selected within the remaining PDB based on periodic-based partial sensing (PBPS) results obtained for another sidelink transmission (e.g., periodic transmission). This means, sensing results for all the corresponding periodic sensing occasions are readily available also for the re-evaluation and pre-emption checking if the same set of Y candidate slots 307 is used. Therefore, these sensing results should be reused as much as possible by initializing a candidate resource set ($S_A$) for re-evaluation and pre-emption checking to the set of all single-slot candidate resources starting from slot (m) of the remaining Y candidate slots 308 from the initial resource selection. If the number of slots in $S_A$ or the remaining Y candidate slots is less than a configured $T_{2min}$ or $Y_{min}$ value, $S_A$ may be extended beyond the remaining Y candidate slots and up to the remaining PDB, even when the UE does not have corresponding sensing results (e.g., from PBPS) for the extended slots.

Contiguous Partial Sensing

As mentioned above, it is important for the UE continuing to perform sensing in the resource pool after the initial resource selection for the purpose of resource verification by re-evaluation and pre-emption checking. For the contiguous partial sensing (CPS) to detect dynamic resource reservations from other UEs, one of the following two methods may be adopted.

Method 1

For a triggered/requested re-evaluation and pre-emption checking by the higher layer, the UE performs contiguous partial sensing within a CPS monitoring window [n+$T_A$, n+$T_B$], where n+$T_A$ is at least M logical slots (309) earlier than slot m, n+$T_B$ is $T_{proc,0}$+$T_{proc,1}$ slots earlier than slot m, and slot m is the smallest slot index among the resource set provided by higher layer for re-evaluation ($r_0$, $r_1$, $r_2$, . . . ) and the resource set for pre-emption checking ($r_0'$, $r_1'$, $r_2'$, . . . ). $T_{proc,0}$ is a UE processing time of 1, 2, or 4 slots depending on sub-carrier spacing allowed for performing the re-evaluation and pre-emption checking process. $T_{proc,1}$ is same as $T_3$, and is a UE processing time of 3, 5, 9 or 17 slots depending on sub-carrier spacing allowed for the UE to prepare PSCCH and PSSCH for transmission. By default, M is 31 unless M is configured with another value. By UE implementation, the UE may monitor more than M slots earlier than slot m, when M is configured.

Method 2

For a triggered/requested re-evaluation and pre-emption checking by the higher layer, the UE performs contiguous partial sensing within a CPS monitoring window [n+$T_A$ n+$T_B$], where n+$T_A$ is slot ($t_{y0}$−$T_{proc,0}$−$T_{proc,1}$) 310, and n+$T_B$ is ($T_{proc,0}$+$T_{proc,1}$) slots earlier than slot m. Slot $t_{y0}$ is the first slot of the selected Y candidate slots used in the initial resource selection for the aperiodic transmission. Meaning the CPS is always performed in every slot after the initial resource selection until the very last retransmission resource for the aperiodic MAC PDU/transport block. Similar to Method 1 above, slot m is the smallest slot index among the resource set provided by higher layer for re-evaluation ($r_0$, $r_1$, $r_2$, . . . ) and the resource set for pre-emption checking ($r_0'$, $r_1$, $r_2'$, . . . ). $T_{proc,0}$ is a UE processing time of 1, 2, or 4 slots depending on sub-carrier spacing allowed for performing the re-evaluation and pre-emption checking process. $T_{proc,1}$ is same as $T_3$, and is a UE processing time of 3, 5, 9 or 17 slots depending on sub-carrier spacing allowed for the UE to prepare PSCCH and PSSCH for transmission.

Periodic-Based Partial Sensing

When the resource pool in which the resources are selected is configured with resource reservation for another $T_B$ (sl-MultiReserveResource) "enabled", the UE monitors periodic sensing occasions corresponding to the remaining Y candidate slots/candidate resource set ($S_A$) 308 for re-evaluation and pre-emption checking according to $t_{y\text{-}k\ x\ Preserve}$ as per PBPS process from the initial resource selection procedure. $t_y$ is a slot belong to the set of the remaining Y candidate slots/candidate resource set ($S_A$) 308.

Resource Exclusions

A resource is excluded from the initialized candidate resource set ($S_A$) 308 if the resource overlaps with a resource indicated in a SCI received among all sensing results (from PBPS and/or CPS) and the measured RSRP for the received SCI is higher than a configured threshold, which is based on the priority of the received SCI ($prio_{RX}$) and L1 priority of the sidelink transport block for transmission ($prio_{TX}$).

Reporting of Re-Evaluation and Pre-Emption for Resource Re-Selection at Higher Layer The UE reports the remaining candidate resource set ($S_A$) after the resource exclusion to the higher layer.

If a resource ($r_x$) of the resource set ($r_0$, $r_1$, $r_2$, . . . ) provided from the higher layer is no longer part of the remaining resource set ($S_A$) after the resource exclusion, meaning the resource has been reserved by a received SCI, the UE reports re-evaluation of resource ($r_x$) to the higher layer for resource re-selection.

Similarly, if a resource ($r_x'$) of the resource set ($r_0'$, $r_1'$, $r_2'$, . . . ) provided from the higher layer is no longer part of the remaining resource set ($S_A$) after the resource exclusion, meaning the resource has been pre-empted by a received SCI, and the L1 priority value for the sidelink transmission ($prio_{TX}$) is larger than the priority value in the received SCI ($prio_{RX}$), the UE reports pre-emption of resource ($r_x'$) to the higher layer for resource re-selection.

The embodiments of the disclosure have been described in detail above in combination with the accompanying drawings, but the disclosure is not limited to the specific details in the above embodiments. Any variations may be made within the technical conception of the present disclosure and shall fall within the scope of protection of the disclosure. For example, the various specific technical features described in the above embodiments may be combined in any suitable way without conflict, and the various possible combinations are not described separately in order to avoid unnecessary repetition. For example, the various embodiments of the disclosure may also be combined in any manner without departing from the concept of the disclosure and the resulting technical solutions shall also fall within the scope of protection of the disclosure. For another example, the various embodiments and/or the technical features of the various embodiments in the disclosure may be combined with the related art in any manner without conflict, and the resulting technical solutions shall also fall within the scope of protection of the disclosure.

It is also to be understood that in various method embodiments of the disclosure, a magnitude of a sequence number of each process does not mean an execution sequence and the execution sequence of each process should be determined by its function and an internal logic and should not form any limit to an implementation process of the embodiments of the disclosure. Furthermore, in the embodiments of the disclosure, the terms "downlink", "uplink" and "sidelink" are used to indicate a direction of transmission of signals or data, "downlink" is used to indicate that the signal or data is transmitted in a first direction from a station to a UE of a cell, "uplink" is used to indicate that the signal or data is transmitted in a second direction from a UE of a cell to a station, and "sidelink" is used to indicate that the signal or data is transmitted in a third direction from UE 1 to UE 2. For example, "downlink signal" indicates that the signal is transmitted in the first direction.

Figure 4:
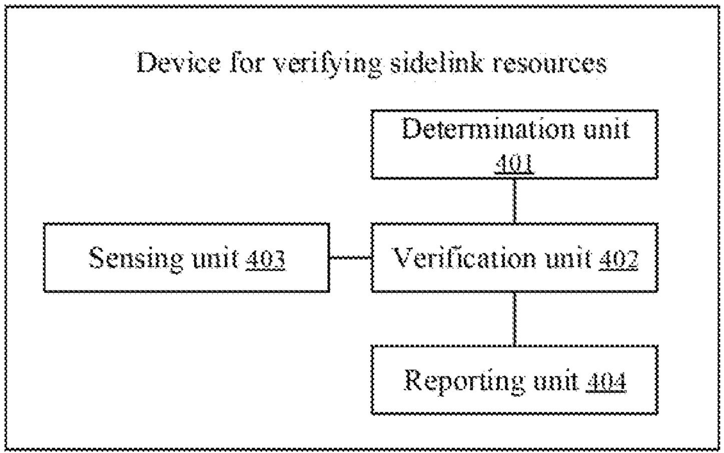
FIG. 4 is a schematic structure diagram of a device for verifying sidelink resources according to an embodiment of the disclosure.

FIG. 4 is a schematic structure diagram of a device for verifying sidelink resources according to an embodiment of the disclosure, which is applicable to a UE. As illustrated in FIG. 4, the device may include a determination unit 401 and a verification unit 402.

The determination unit 401 is configured to determine pre-selected sidelink resources and/or reserved sidelink resources. The sidelink resources are used for aperiodic sidelink transmission.

The verification unit 402 is configured to perform re-evaluation on the pre-selected sidelink resources and/or pre-emption checking on the reserved sidelink resources based on all available PBPS and/or CPS results.

The aperiodic sidelink transmission is defined by a resource reservation periodicity set to zero, i.e., $P_{rsvp\_Tx}=0$.

In some implementation modes, the determination unit 401 may be configured to receive, through a physical layer, a first resource set and/or a second resource set provided by a higher layer. The first resource set includes a pre-selected resource set. The second resource set includes a reserved resource set. A resource in the pre-selected resource set refers to a pre-selected sidelink resource for re-evaluation, and a resource in the reserved resource set refers to a reserved sidelink resource for pre-emption checking. The pre-selected sidelink resource is a resource which has not been identified by a prior sidelink control information (SCI), and the reserved sidelink resource is a resource which has been indicated by the prior SCI.

In some implementation modes, the first resource set may include resources selected by the higher layer of the UE within a remaining packet delay budget (PDB) during an initial resource selection.

In some implementation modes, the determination unit 401 may be configured to determine a candidate slot set, and perform initialization on a candidate resource set based on the candidate slot set.

The device may further include a sensing unit 403. The sensing unit 403 is configured to perform PBPS and/or CPS to obtain sensing results.

The verification unit 402 is configured to exclude one or more resources from the candidate resource set based on the sensing results.

In some implementation modes, the candidate slot set may include slots selected by the UE within a remaining PDB based on PBPS and/or CPS results during an initial resource selection.

In some implementation modes, the determination unit 401 may be configured to initialize the candidate resource set to a remaining candidate slot set. Part or all of candidate slots in the remaining candidate slot set belong to the candidate slot set, and a starting slot corresponding to the remaining candidate slot set is a first slot with a smallest slot index among the first resource set and the second resource set.

In some implementation modes, the candidate resource set is initialized beyond an ending slot corresponding to the last slot of the candidate slot set if a number of slots in the remaining candidate slot set or the candidate resource set is less than a threshold.

In some implementation modes, the determination unit 401 may be configured to initialize the candidate resource set to the remaining candidate slot set, to enable the ending slot of the candidate resource set to be the last slot of the candidate slot set.

In some implementation modes, the sensing unit 403 may be configured to monitor target slots based on a PBPS process and/or a CPS process, to obtain the sensing results.

In some implementation modes, the sensing unit 403 may be configured to monitor periodic sensing occasions corresponding to the remaining candidate slot set after the initial resource selection when resource reservation sl-MultiReserveResource is enabled.

In some implementation modes, the sensing unit 403 may be configured to perform contiguous partial sensing within a monitoring window. In one embodiment, a starting slot of the monitoring window is at least M slots earlier than a first slot, and an ending slot of the monitoring window is N slots earlier than the first slot. In another embodiment, a starting slot of the monitoring window is a first slot of the candidate slot set from the initial resource selection minus N, and an ending slot of the monitoring window is N slots earlier than a second slot. The second slot has a smallest slot index among the first resource set and the second resource set. M and N are positive integers.

In some implementation modes, a value of M is 31 by default unless configured by a network with another value.

In some implementation modes, a value of N is $T_{proc,0}+T_{proc,1}$. $T_{proc,0}$ and $T_{proc,1}$ have predefined values depending on a sub-carrier spacing.

In some implementation modes, the verification unit 402 may be configured to, responsive to determining based on the sensing results that one or more resources in the candidate resource set overlap with one or more resources indicated in a received SCI and a reference signal received power (RSRP) measured for the received SCI is higher than a configured threshold, exclude the one or more resources from the candidate resource set to obtain the remaining candidate resource set.

In some implementation modes, the device may further include a reporting unit 404. The reporting unit 404 is configured to report the remaining candidate resource set to the higher layer.

In some implementation modes, the reporting unit 404 may be configured to report, when a first resource in the pre-selected resource set is not part of the remaining candidate resource set, re-evaluation of the first resource to the higher layer; and/or, report, when a second resource in the reserved resource set is not part of the remaining candidate resource set and a priority value of the physical layer for the sidelink transmission is larger than a priority value in the received SCI, pre-emption of the second resource to the higher layer.

It is to be understood by those skilled in the art that in the embodiments of the disclosure, the description on the device for verifying sidelink resources may be understood with reference to the above related description on the method for verifying sidelink resources.

Figure 5:
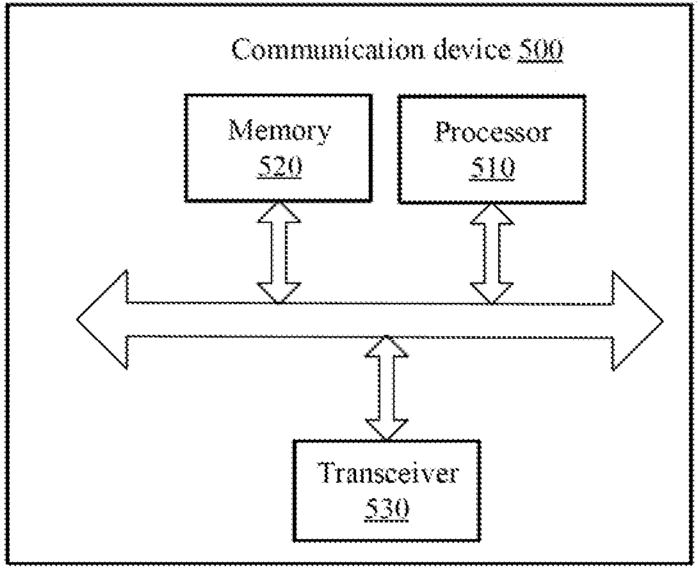
FIG. 5 is a schematic structure diagram of a communication device according to an embodiment of the disclosure.

FIG. 5 is a schematic structure diagram of a communication device 500 according to an embodiment of the disclosure. The communication device may be a UE. The communication device 500 illustrated in FIG. 5 includes a processor 510, and the processor 510 may call and run a computer program in a memory to implement the method in the embodiments of the disclosure.

In one example, as illustrated in FIG. 5, the communication device 500 may further include a memory 520. The processor 510 may call and run the computer program in the memory 520 to implement the method in the embodiments of the disclosure.

The memory 520 may be a separate device independent of the processor 510 and may also be integrated into the processor 510.

In one example, as illustrated in FIG. 5, the communication device 500 may further include a transceiver 530. The processor 510 may control the transceiver 530 to communicate with other devices, specifically, to send information or data to the other device or receiving information or data sent by the other device.

The transceiver 530 may include a transmitter and a receiver. The transceiver 530 may further include an antenna (s), the number of which may be one or more.

The communication device 500 may specifically be the UE of the embodiments of the disclosure, and the communication device 500 may implement corresponding flows implemented by the UE in each method of the embodiments of the disclosure, which will not be elaborated herein for simplicity.

Figure 6:
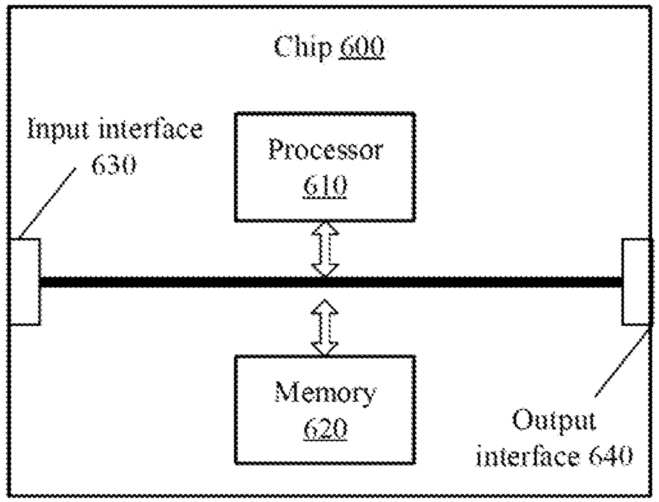
FIG. 6 is a schematic structure diagram of a chip according to an embodiment of the disclosure.

FIG. 6 is a schematic structure diagram of a chip according to an embodiment of the disclosure. The chip 600 illustrated in FIG. 6 includes a processor 610. The processor 610 may call and run a computer program in a memory to implement the method in the embodiments of the disclosure.

In one example, as illustrated in FIG. 6, the chip 600 may further include a memory 620. The processor 610 may call and run a computer program in the memory 620 to implement the method in the embodiments of the disclosure.

The memory 620 may be a separate device independent of the processor 610 and may also be integrated into the processor 610.

In one example, the chip 600 may further include an input interface 630. The processor 610 may control the input interface 630 to communicate with the other device or chip, specifically to acquire information or data from the other device or chip.

In one example, the chip 600 may further include an output interface 640. The processor 610 may control the output interface 640 to communicate with the other device or chip, specifically to output information or data to the other device or chip.

The chip may be applied to the UE of the embodiments of the disclosure, and the chip may implement corresponding flows implemented by the UE in each method of the embodiment of the disclosure, which will not be elaborated herein for simplicity.

It is to be understood that in the embodiments of the disclosure, the chip may also be referred to as a system level chip, a system chip, a chip system or an on-chip system chip.

It is to be understood that the processor in the embodiment of the disclosure may be an integrated circuit chip and has a signal processing capacity. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another Programmable Logic Device (PLD), a discrete gate or transistor logic device, and a discrete hardware component. Each method, operation and logical block diagram disclosed in the embodiments of the disclosure may be implemented or executed. The universal processor may be a microprocessor, or the processor may also be any conventional processor, etc. The operations of the method disclosed in combination with the embodiments of the disclosure may be directly embodied to be executed and completed by a hardware decoding processor or executed and completed by a combination of hardware and software modules in the decoding processor. The software module may be in a mature storage medium in this field such as a Random Access Memory (RAM), a flash memory, a Read-Only Memory (ROM), a Programmable ROM (PROM) or Electrically Erasable PROM (EEPROM), and a register. The storage medium is in a memory, and the processor reads information in the memory and completes the operations of the method in combination with hardware.

It may be understood that the memory in the embodiment of the disclosure may be a volatile memory or a non-volatile memory, or may include both the volatile and non-volatile memories. The non-volatile memory may be a ROM, a PROM, an Erasable PROM (EPROM), an EEPROM, or a flash memory. The volatile memory may be a RAM and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memory of a system and method described in the disclosure is intended to include, but not limited to, memories of these and any other proper types.

It is to be understood that the above memory is exemplarily but unlimitedly described. For example, the memory in the embodiments of the disclosure may also be an SRAM, a DRAM, an SDRAM, a DDR SDRAM, an ESDRAM, an SLDRAM, and a DR RAM. That is, the memory in the embodiments of the disclosure is intended to include, but not limited to, memories of these and any other proper types.

The embodiments of the disclosure also provide a computer-readable storage medium, which is configured to store a computer program. The computer-readable storage medium may be applied to a UE in the embodiments of the disclosure, and the computer program enables a computer to execute corresponding flows implemented by the UE in each method of the embodiments of the disclosure. For simplicity, it will not be elaborated herein.

The embodiments of the disclosure also provide a computer program product, which includes a computer program instruction. The computer program product may be applied to a UE in the embodiments of the disclosure, and the computer program instruction enables a computer to execute corresponding flows implemented by the UE in each method of the embodiments of the disclosure. For simplicity, it will not be elaborated herein.

The embodiments of the disclosure also provide a computer program. The computer program may be applied to a UE in the embodiments of the disclosure, and the computer program, when run in a computer, enables the computer to execute corresponding flows implemented by the UE in each method of the embodiments of the disclosure. For simplicity, it will not be elaborated herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed by hardware or software depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided in the disclosure, it is to be understood that the disclosed system, device and method may be implemented in another manner. For example, the device embodiments described above are only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, of the apparatus or the units, and may be electrical and mechanical or adopt other forms.

The units described as separate parts may or may not be physically separated, and parts displayed as units may or may not be physical units, and namely may be in the same place, or may also be distributed to multiple network units. Part or all of the units may be selected to achieve the purposes of the solutions of the embodiments according to a practical requirement.

In addition, each function unit in each embodiment of the disclosure may be integrated into a processing unit, each unit may also physically exist independently, and two or more than two units may also be integrated into a unit.

When realized in form of software function unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The above storage medium includes various media capable of storing program codes such as a U disk, a mobile hard disk, a ROM, a RAM, a magnetic disk, or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for verifying sidelink resources, comprising:

determining, by user equipment (UE), pre-selected sidelink resources and/or reserved sidelink resources, the sidelink resources being used for aperiodic sidelink transmission; and performing, by the UE, re-evaluation on the pre-selected sidelink resources and/or pre-emption checking on the reserved sidelink resources based on all available periodic-based partial sensing (PBPS) and/or contiguous partial sensing (CPS) results;

wherein the aperiodic sidelink transmission is defined by a resource reservation periodicity set to zero, wherein determining, by the UE, the pre-selected sidelink resources and/or the reserved sidelink resources comprises:

receiving, by a physical layer of the UE, a first resource set and/or a second resource set provided by a higher layer, the first resource set comprising a pre-selected resource set, the second resource set comprising a reserved resource set, a resource in the pre-selected resource set being a pre-selected sidelink resource for re-evaluation, and a resource in the reserved resource set being a reserved sidelink resource for pre-emption checking;

wherein the pre-selected sidelink resource is a resource which has not been indicated by a prior sidelink control information (SCI) and the reserved sidelink resource is a resource which has been indicated by the prior SCI.

2. The method of claim 1, wherein the first resource set comprises resources selected by the higher layer of the UE within a remaining packet delay budget (PDB) during an initial resource selection.

3. The method of claim 1, wherein performing, by the UE, re-evaluation on the pre-selected sidelink resources and/or pre-emption checking on the reserved sidelink resources comprises:

determining, by the UE, a candidate slot set, and performing initialization on a candidate resource set based on the candidate slot set;

performing, by the UE, PBPS and/or CPS, to obtain sensing results; and excluding, by the UE, one or more resources from the candidate resource set based on the sensing results.

4. The method of claim 3, wherein the candidate slot set comprises slots selected by the UE within a remaining PDB based on PBPS and/or CPS results during an initial resource selection.

5. The method of claim 3, wherein determining, by the UE, the candidate slot set, and performing initialization on the candidate resource set based on the candidate slot set comprises:

initializing the candidate resource set to a remaining candidate slot set, wherein part or all of candidate slots in the remaining candidate slot set belong to the candidate slot set, and a starting slot corresponding to the remaining candidate slot set is a first slot with a smallest slot index among the first resource set and the second resource set.

6. The method of claim 5, wherein initializing the candidate resource set to the remaining candidate slot set comprises:

initializing the candidate resource set to the remaining candidate slot set, to enable an ending slot of the candidate resource set to be the last slot of the candidate slot set.

7. A device for verifying sidelink resources, applicable to user equipment (UE), the device comprising:

a memory storing computer-executable instructions; and a processor, configured to call and execute the computer-executable instructions in the memory to execute operations of:

determining pre-selected sidelink resources and/or reserved sidelink resources, the sidelink resources being used for aperiodic sidelink transmission; and performing re-evaluation on the pre-selected sidelink resources and/or pre-emption checking on the reserved sidelink resources based on all available periodic-based partial sensing (PBPS) and/or contiguous partial sensing (CPS) results;

wherein the aperiodic sidelink transmission is defined by a resource reservation periodicity set to zero, wherein determining the pre-selected sidelink resources and/or the reserved sidelink resources comprises:

receiving, through a physical layer, a first resource set and/or a second resource set provided by a higher layer, the first resource set comprising a pre-selected resource set, the second resource set comprising a reserved resource set, a resource in the pre-selected resource set being a pre-selected sidelink resource for re-evaluation, and a resource in the reserved resource set being a reserved sidelink resource for pre-emption checking;

wherein the pre-selected sidelink resource is a resource which has not been identified by a prior sidelink control information (SCI) and the reserved sidelink resource is a resource which has been indicated by the prior SCI.

8. The device of claim 7, wherein the first resource set comprises resources selected by the higher layer of the UE within a remaining packet delay budget (PDB) during an initial resource selection.

9. The device of claim 7, wherein performing re-evaluation on the pre-selected sidelink resources and/or pre-emption checking on the reserved sidelink resources comprises:

determining a candidate slot set, and performing initialization on a candidate resource set based on the candidate slot set;

performing PBPS and/or CPS to obtain sensing results; and excluding one or more resources from the candidate resource set based on the sensing results.

10. The device of claim 9, wherein performing PBPS and/or CPS to obtain the sensing results comprises:

monitoring target slots based on a PBPS process and/or a CPS process, to obtain the sensing results.

11. The device of claim 10, wherein monitoring target slots based on the PBPS process comprises:

monitoring periodic sensing occasions corresponding to the remaining candidate slot set after the initial resource selection when resource reservation sl-MultiReserveResource is enabled.

12. The device of claim 10, wherein monitoring target slots based on the CPS process comprises:

performing contiguous partial sensing within a monitoring window, wherein a starting slot of the monitoring window is at least M slots earlier than a first slot, an ending slot of the monitoring window is N slots earlier than the first slot, and the first slot has a smallest slot index among the first resource set and the second resource set.

13. The device of claim 12, wherein a value of M is 31 by default unless configured by a network with another value.

14. The device of claim 12, wherein a value of N is $T_{proc,0}+T_{proc,1}$, $T_{proc,0}$ and $T_{proc,1}$ have predefined values depending on a sub-carrier spacing.

15. The device of claim 9, wherein excluding the one or more resources from the candidate resource set based on the sensing results comprises:

responsive to determining based on the sensing results that one or more resources in the candidate resource set overlap with one or more resources indicated in a received SCI and a reference signal received power (RSRP) measured for the received SCI is higher than a configured threshold, exclude the one or more resources from the candidate resource set to obtain the remaining candidate resource set.

16. The device of claim 15, wherein the processor is configured to call and execute the computer-executable instructions in the memory to further execute an operation of:

reporting, by the physical layer of the UE, the remaining candidate resource set to the higher layer.

17. The device of claim 15, wherein the processor is configured to call and execute the computer-executable instructions in the memory to further execute at least one of:

responsive to that a first resource in the pre-selected resource set is not part of the remaining candidate resource set, reporting re-evaluation of the first resource to the higher layer; or, responsive to that a second resource in the reserved resource set is not part of the remaining candidate resource set and a priority value of the physical layer for the sidelink transmission is larger than a priority value in the received SCI, reporting pre-emption of the second resource to the higher layer.

18. A non-transitory computer-readable storage medium having stored thereon computer-executable instructions that, when executed by a processor, causes the processor to execute operations of:

determining pre-selected sidelink resources and/or reserved sidelink resources, the sidelink resources being used for aperiodic sidelink transmission; and performing re-evaluation on the pre-selected sidelink resources and/or pre-emption checking on the reserved sidelink resources based on all available periodic-based partial sensing (PBPS) and/or contiguous partial sensing (CPS) results;

wherein the aperiodic sidelink transmission is defined by a resource reservation periodicity set to zero, wherein determining the pre-selected sidelink resources and/or the reserved sidelink resources comprises:

receiving, through a physical layer, a first resource set and/or a second resource set provided by a higher layer, the first resource set comprising a pre-selected resource set, the second resource set comprising a reserved resource set, a resource in the pre-selected resource set being a pre-selected sidelink resource for re-evaluation, and a resource in the reserved resource set being a reserved sidelink resource for pre-emption checking;

wherein the pre-selected sidelink resource is a resource which has not been identified by a prior sidelink control information (SCI) and the reserved sidelink resource is a resource which has been indicated by the prior SCI.

19. The storage medium of claim 18, wherein the first resource set comprises resources selected by the higher layer within a remaining packet delay budget (PDB) during an initial resource selection.

20. The storage medium of claim 18, wherein performing re-evaluation on the pre-selected sidelink resources and/or pre-emption checking on the reserved sidelink resources comprises:

determining a candidate slot set, and performing initialization on a candidate resource set based on the candidate slot set;

performing PBPS and/or CPS to obtain sensing results; and excluding one or more resources from the candidate resource set based on the sensing results.

* * * * *